June 2, 1931.  E. BABB  1,807,647
CONDUIT AND CONNECTING MEANS THEREFOR
Filed Oct. 3, 1928
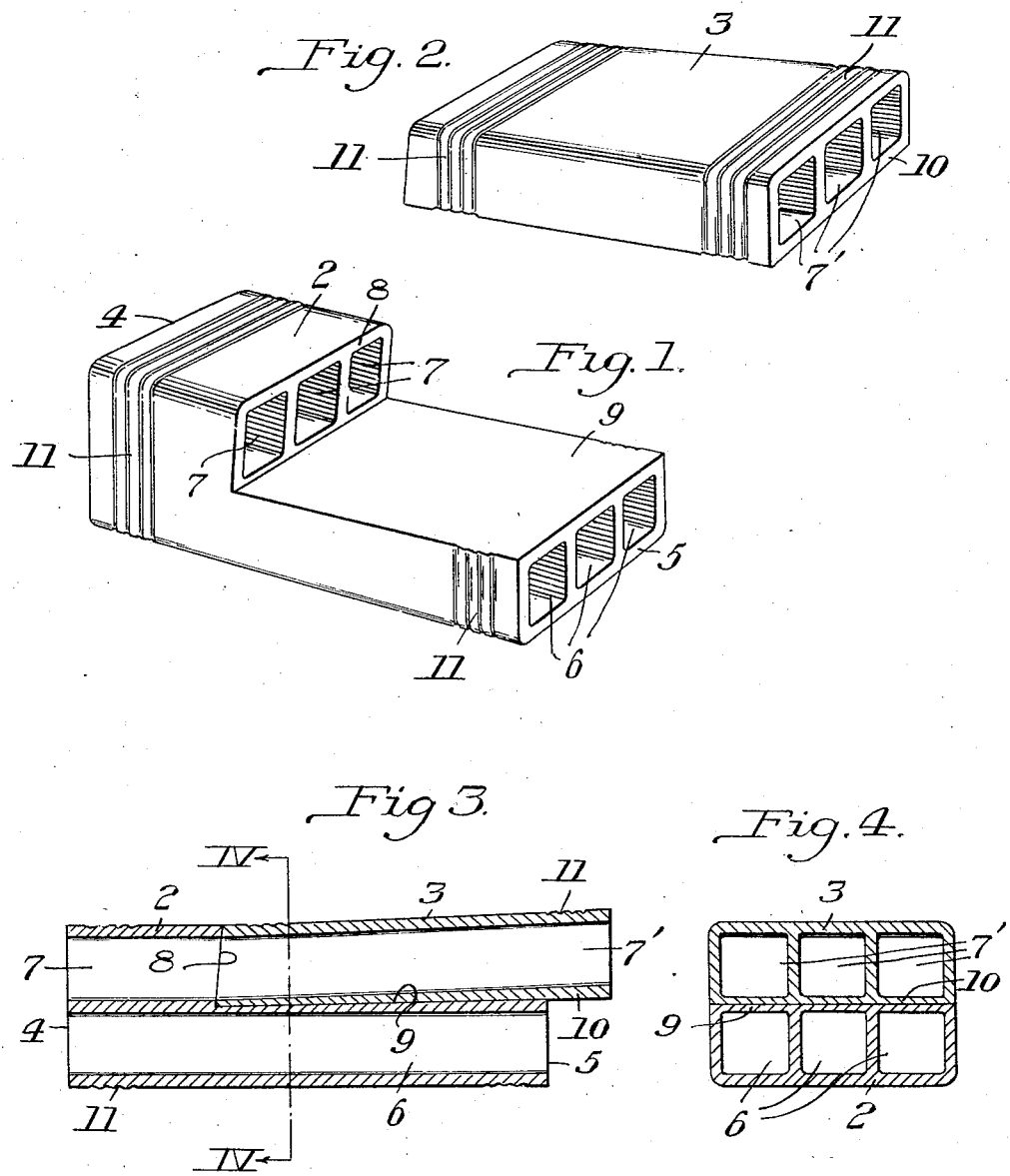

Patented June 2, 1931

1,807,647

UNITED STATES PATENT OFFICE

EDWIN BABB, OF AULTMAN, OHIO, ASSIGNOR, BY MESNE ASSIGNMENTS, TO NATIONAL FIREPROOFING CORPORATION, OF PITTSBURGH, PENNSYLVANIA, A CORPORATION OF PENNSYLVANIA

CONDUIT AND CONNECTING MEANS THEREFOR

Application filed October 3, 1928. Serial No. 310,005.

This invention relates to conduit and connecting means therefor. It relates more particularly to conduit such as is adapted for carrying electric conductors. It relates still more particularly to means for connecting a conduit with a plurality of conduits extending therefrom so that a branch joint may be formed.

Conduit connecting means of the general type herein contemplated have been heretofore known but such means have been attended with various disadvantages. One such connecting means comprises a multiduct conduit opposite halves or portions of which are split from each other throughout a portion only of the length of the conduit and are permanently separated throughout such portion by the insertion of a wedge or other separating means. Such means are expensive to manufacture and of weakened construction by reason of the strains set up in the conduit when the opposite portions thereof are spread apart.

It has also been proposed to join a single conduit and a plurality of conduits extending therefrom by using the ordinary type of multiduct and corresponding single or multiduct conduit and setting them end to end. Such a construction has the disadvantages that a tight and secure joint is almost impossible to attain and the interior surfaces of the conduit are not flush one with another, whereby damage may be done to the conductors in drawing them through the conduit. Various other types of connecting means have also been tried and found to be unsatisfactory for various reasons.

I provide a means for connecting a conduit with a plurality of conduits extending therefrom which obviates the disadvantages above mentioned. More specifically, I provide means of such nature comprising a member having a portion of its wall extending beyond another portion in the direction of its length and at least one cooperating member abutting such member at the second mentioned portion thereof.

The detailed features of the invention will become apparent from the following description of a present preferred embodiment thereof.

In the accompanying drawings I have shown a present preferred embodiment of the invention, wherein Figure 1 is a perspective view of one member forming a part of a conduit connecting means;

Figure 2 is a perspective view of a member adapted to cooperate with that shown in Figure 1;

Figure 3 is a central vertical cross-section taken longitudinally through the members shown in Figs. 1 and 2 when they are in cooperative relation, and Figure 4 is a cross-section taken on the line IV—IV of Fig. 3.

Referring more particularly to the drawings, reference numerals 2 and 3 designate generally a pair of cooperating members adapted to connect a conduit with a plurality of conduits extending therefrom. In the illustrated embodiment the connecting means shown are specifically adapted for joining multiduct conduit, although it will be understood that the invention is equally applicable to joining single duct conduit.

The member shown in Fig. 1 is the principal connecting member. It has two opposite end faces 4 and 5, the former of which has six ducts passing therethrough. Three of such ducts, indicated in the drawings by reference numeral 6, extend completely through the member and terminate in the face 5. The other three ducts, indicated by reference numeral 7, terminate intermediate the ends of the member 2 in a surface 8. The member 3 has three ducts 7' extending completely therethrough.

The upper wall 9, viewing the drawings, of the ducts 6 in the member 2 varies in thickness from the surface 5 to the surface 8. Such wall is of substantially normal thickness at the surface 5 and tapers to approximately half of its normal thickness adjacent the surface 8. Likewise the wall 10 of the member 3 varies in thickness from one extremity to the other, being of substantially half its normal thickness at the extremity adapted to abut the member 2 and being of substantially normal thickness at the opposite extremity. The member 3 is adapted to co-operate with the member 2 as clearly shown in Fig. 3.

When the connecting members are placed together in the cooperative position shown, a smooth joint is provided from each duct 7 to its corresponding duct 7' by reason of the tapering of the walls 9 and 10 as above described. Furthermore by reason of such provision, the full normal insulation is at all times maintained between conductors in ducts 7 and 7' and those in ducts 6.

The surface 8 is preferably disposed at an acute angle to the axis of the member 2 as clearly shown in the drawings, and the surface of the member 3 adapted to abut the surface 8 is disposed at a suitable angle so that such surfaces will be flush at all points when the wall 10 rests upon the wall 9. By reason of the disposition of the surface 8 at an acute angle to the axis of the member 2 a substantial wedging effect is exerted between the members 2 and 3 when in their cooperative positions, tending to urge such members toward one another against any force which might tend to separate them. Thus a secure and smooth joint is established which provides for converting a six-duct conduit into two three-duct conduits extending generally in the same direction as the six-duct conduit but at a slight angle to one another. The angle between the axes of the ducts 7 and the ducts 7' may be varied as desired by varying the taper of the walls 9 and 10 and of the surface 8 and the surface of the member 3 abutting thereagainst.

By reason of the separation of the ducts and the provision of a wall of normal thickness at the extremity of each, normal conduit sections may be laid next the respective members 2 and 3 and will form perfectly smooth alined joints therewith. It is preferred to provide the member 3 of sufficient length that its outer face extends past the face 5 of the member 2 in order that the joints between such members and the conduit connected thereto may be staggered, whereby the construction is simplified and strengthened.

The members 2 and 3 may be formed of normal extruded conduit sections by cutting away portions thereof before or after such sections are burned. If this step is taken before the sections are burned, as is preferred, it may be accomplished by means of a tightly stretched wire which may be drawn through the plastic clay. For instance, in forming the member 2 a tightly stretched wire may be drawn longitudinally through the wall 9 from the surface 5, beginning at the upper surface of the wall 9 and gradually cutting into such surface until a point adjacent the proposed surface 8 is reached, at which time the wire will be half way through the surface 9. The wire may then be drawn through the ducts 7 at the desired angle to the member 2, and the severed portion removed. In like manner the member 3 may be formed.

The surface 8 may comprise a pair of surfaces extending at an angle to one another if desired, and cooperating with separate members corresponding to the member 3, so that the ducts 7' may be led off in different directions.

Although the preferred embodiment is illustrated by the use of a six-duct conduit joined with a pair of three-duct conduits, it will be understood that the invention is equally applicable to any multiduct conduit whatsoever. It may, for example, be used to divide a two-duct conduit into a pair of single-duct conduits or to divide a nine-duct conduit into a three-duct conduit and a six-duct conduit. Scarifications 11 may be formed in the members if desired.

While I have illustrated and described a present preferred embodiment of the invention, I wish it distinctly understood that the same is not limited thereto but may be otherwise embodied within the scope of the following claims.

I claim:—

1. As a manufacture, means for connecting a conduit with a plurality of conduits extending therefrom comprising a unitary member having a portion of its wall cut away and at least one cooperating member having a portion adapted to enter the space provided by the cut away portion and abut the wall adjacent thereto.

2. As a manufacture, means for connecting a conduit with a plurality of conduits extending therefrom comprises a unitary member having a portion of its wall extending beyond another portion in the direction of its length and at least one cooperating member abutting such member at the second mentioned portion thereof.

3. As a manufacture, means for connecting a conduit with a plurality of conduits extending therefrom comprising a unitary member having a wall, a portion of which terminates in at least one surface extending transversely of the member and abutting another portion of the wall, and at least one cooperating member abutting such surface.

4. As a manufacture, means for connecting a conduit with a plurality of conduits extending therefrom comprising a unitary member in the form of a length of conduit having a portion substantially in the form of a prism removed therefrom and at least one cooperating member having a portion adapted to enter the space provided by the removed portion and abut against the wall adjacent thereto.

5. As a manufacture, means for connecting a conduit with a plurality of conduits extending therefrom comprising a unitary member having at least one transverse face intermediate its ends and at least one cooperating member abutting such face.

6. As a manufacture, means for connecting a conduit with a plurality of conduits extending therefrom comprising a unitary member having a recess in its wall extending generally longitudinally thereof and terminating in substantially wedge shape, and at least one cooperating member having a wedge shaped longitudinal extremity adapted to enter the recess.

7. As a manufacture, means for connecting a conduit with a plurality of conduits extending therefrom comprising a unitary member in the form of a length of conduit having a portion at one end removed leaving at least one transverse surface which slopes toward the opposite end of the length of conduit from its surface inwardly and at least one cooperating member adapted to abut such surface.

8. As a manufacture, means for connecting a conduit with a plurality of conduits extending therefrom comprising a unitary conduit section having at least one duct extending beyond at least one other duct in the direction of its length and at least one cooperating section adapted to abut the second mentioned duct and lie along the first mentioned duct.

9. As a manufacture, means for connecting a conduit with a plurality of conduits extending therefrom comprising a unitary member in the form of a conduit section from which a portion of its mass has been severed along a portion only of the length of a wall between ducts and at least one cooperating member having a portion adapted to enter the space provided by the severed portion to connect it with the first mentioned member.

10. As a manufacture, means for connecting a conduit with a plurality of conduits extending therefrom comprising a unitary member having a plurality of ducts having a common wall, at least one of such ducts terminating intermediate the ends of the member, and at least one cooperating member abutting the end of said duct.

11. As a manufacture, means for connecting a conduit with a plurality of conduits extending therefrom comprising a unitary member having a plurality of ducts having a common wall, at least one of such ducts terminating intermediate the ends of the member, the thickness of said wall being reduced at the termination of said duct, and at least one cooperating member abutting the end of said duct.

12. As a manufacture, means for connecting a conduit with a plurality of conduits extending therefrom comprising a unitary member having a plurality of ducts having a common wall, at least one of such ducts terminating intermediate the ends of the member, the thickness of said wall being reduced at the termination of said duct, and increasing from such point to the end of the member, and at least one cooperating member abutting the end of said duct.

13. As a manufacture, means for connecting a conduit with a plurality of conduits extending therefrom comprising a unitary member having a plurality of ducts having a common wall, at least one of such ducts terminating intermediate the ends of the member, the thickness of said wall being reduced at the termination of said duct, and at least one cooperating member abutting the end of said duct, said cooperating member having a wall of reduced thickness at its abutting extremity.

14. As a manufacture, means for connecting a conduit with a plurality of conduits extending therefrom comprising a unitary member having a plurality of ducts having a common wall, at least one of such ducts terminating intermediate the ends of the member, the thickness of said wall being reduced at the termination of said duct, and at least one cooperating member abutting the end of said duct, said cooperating member having a wall of such thickness at its abutting extremity that the sum of its thickness and the thickness of the first mentioned wall at the termination of said duct equals the normal thickness of a wall of the conduit.

15. As a manufacture, means for connecting a conduit with a plurality of conduits extending therefrom comprising a unitary member having a plurality of ducts having a common wall, at least one of such ducts terminating intermediate the ends of the member, the thickness of said wall being reduced at the termination of said duct to substantially one half its normal thickness, and at least one cooperating member abutting the end of said duct, said cooperating member having a wall reduced in thickness at its abutting extremity to substantially one half its normal thickness whereby the sum of its thickness and the thickness of the first mentioned wall at the termination of said duct equals the normal thickness of a wall of the conduit.

16. As a manufacture, means for connecting a conduit with a plurality of conduits extending therefrom comprising a unitary member having a plurality of ducts having a common wall, at least one of such ducts terminating intermediate the ends of the member, the thickness of said wall being reduced at the termination of said duct to less than its normal thickness and increasing from such point to normal thickness at its extremity, and at least one cooperating member abutting the end of said duct, said cooperating member having a wall reduced to less than normal thickness at its abutting extremity and increasing to normal thickness at its opposite extremity.

17. As a manufacture, means for connecting a conduit with a plurality of conduits extending therefrom comprising a plurality of unitary cooperating members joined intermediate the extremities of at least one of such members and extending at an angle one to another.

18. As a manufacture, means for connecting a conduit with a plurality of conduits extending therefrom comprising a plurality of unitary cooperating members joined intermediate the extremities of at least one of such members and having contacting walls reduced in thickness at the joint between the members so that the thickness at such joint of a wall formed by such contacting walls is not substantially greater than the normal thickness of a wall of the conduit.

19. As a manufacture, means for connecting a conduit with a plurality of conduits extending therefrom comprising a plurality of unitary cooperating members joined intermediate the extremities of at least one of such members along at least one surface making an acute angle with the axes of the respective members.

In testimony whereof I have hereunto set my hand.

EDWIN BABB.